United States Patent [19]

Kentro

[11] 3,854,930
[45] Dec. 17, 1974

[54] PROCESS FOR THE REMOVAL OF LEAD FROM MOLYBDENITE

[75] Inventor: Dan M. Kentro, Greenwich, Conn.

[73] Assignee: Molybdenum Corporation of America, White Plains, N.Y.

[22] Filed: Nov. 5, 1973

[21] Appl. No.: 412,584

[52] U.S. Cl.......................... 75/1, 423/56, 75/101 R
[51] Int. Cl. ........................ C22b 1/00, C22b 49/00
[58] Field of Search ........... 423/56, 98; 75/101 R, 1

[56] References Cited
UNITED STATES PATENTS 1,838,767   12/1931   Iredell................................. 423/56
3,053,614   9/1962   Foos et al. ..................... 75/101 R X
3,642,467   2/1972   Bratt et al......................... 75/101 R
3,694,147   9/1972   Drobnick et al................. 423/98 X

FOREIGN PATENTS OR APPLICATIONS 593,906   10/1947   Great Britain....................... 423/56

Primary Examiner—A. B. Curtis
Attorney, Agent, or Firm—Sheridan, Ross & Fields

[57] ABSTRACT

The lead content of molybdenite concentrate is reduced by heating the concentrate with ammonium chloride followed by leaching the treated concentrate with hydrochloric or nitric acid to convert the lead to soluble compounds.

5 Claims, No Drawings

PROCESS FOR THE REMOVAL OF LEAD FROM MOLYBDENITE

BACKGROUND OF THE INVENTION

Ore bodies containing molybdenite also frequently contain lead sulfide and other metal compound impurities which are mined along with the molybdenite. In the normal froth flotation process for concentrating the ore to recover molybdenite a part of the lead sulfide along with other metal impurities remain in the molybdenite concentrate. A salable molybdenite concentrate must not contain more than about .06–.07 percent by weight of lead. Reduction of the contents of other metals in the concentrate is also desirable.

It is well known that removal of lead impurity from molybdenite concentrate can be accomplished by treating the concentrate with aqueous mineral acids, such as hydrochloric and nitric acid, to convert the lead into a soluble compound. However, this procedure is not always effective for reducing the lead content in the concentrate below the specification amount. Furthermore, the use of the acid alone without a reagent to inhibit the solution of oxides of molybdenum in the acid results in a prohibitive amount of molybdenum being dissolved and lost.

It has been found that these disadvantages are obviated by the process of the present invention in which the molybdenite concentrate before treatment with the aqueous mineral acid is heated with ammonium chloride under the conditions set forth below.

STATEMENT OF THE INVENTION

The invention comprises heating the molybdenite concentrate in absence of free access of air with about ½ to about 25 percent by weight of ammonium chloride based on the concentrate at a temperature between about 150° C to about 450° C for a period from about ½ hour to 3 hours prior to treating the concentrate with dilute mineral acid. The preferred mineral acid is hydrochloric acid. Free access of air should be excluded during the treatment to prevent oxidation of molybdenite, otherwise up to 2 percent of molybdenum in the form of the oxide will be dissolved and lost in the leaching step.

The strength of the acid used in the leaching step is optimized for the particular concentrate treated, as is well known in the art. In order to conserve acid, the leach solution may be recycled several times following reduction of the lead content thereof by such well known means as crystallization of lead chloride, precipitation of lead sulfate, precipitation of lead chlorofluoride, etc.

SPECIFIC MODIFICATIONS OF THE INVENTION

EXAMPLE 1

The following example including comparative tests demonstrates that heat treatment of a molybdenite concentrate in the presence of ammonium chloride followed by a conventional hydrochloric acid leach effectively reduces the lead content below the prohibited amount and that the effect produced by ammonium chloride is not due to the presence of ammonium chloride during the leaching step. In the tests A-D, inclusive, 100-gram portions of a molybdenite concentrate containing 52.9 percent by weight molybdenum and 0.306 percent by weight lead were treated as set forth.

A. The concentrate was leached directly without the pre-heat step in 250 ml. of 1.4 normal HCl for 30 minutes at 80° C.

B. The concentrate without the addition of ammonium chloride was heated in a covered dish for 1 hour at 300° C and leached as in (A) above.

C. The concentrate was mixed with 10 grams of NH₄Cl, heated in a covered dish for 1 hour at 300° C and leached as in (A) above.

D. The concentrate was leached without the preheat step with ammonium chloride in 250 ml. of 1.4 normal HCl solution containing 10 grams of NH₄Cl for 30 minutes at 80° C.

The leach slurries were filtered, washed with hot water and analyses performed with the following results:

| Test | % Pb in Dry Residue | Mo Soluble |
|------|---------------------|------------|
| A    | 0.120%              | 0.14       |
| B    | 0.084%              | 0.38%      |
| C    | 0.035%              | 0.66%      |
| D    | 0.119%              | 0.56%      |

Prohibitive amounts of lead, far above the allowed maximum of about 0.07 percent, remained in the concentrate after the application of Tests A, B and D to the concentrate while the amount of lead remaining in the concentrate after Test C performed in accordance with the invention is 0.035 percent, far below the allowed maximum. The amount of molybdenum solubilized, that is, 0.66 percent, is well below the permissible maximum for an economically feasible process. Test D in which the concentrate was leached in the presence of ammonium chloride without first being treated with a preheat step in the presence of ammonium chloride resulted in 0.119 percent lead remaining in the treated concentrate, these results compared with the results of Test C showing that the effect produced by the invention cannot be obtained by adding the ammonium chloride in the leaching step, in the absence of the preheat step in the presence of ammonium chloride.

EXAMPLE 2

The following example illustrates the operative ranges of temperature, heating time and amounts of ammonium chloride for the process. For the tests set forth in the example, concentrates containing various amounts of lead were used as shown in the table. Following heating for the period shown, the treated samples were leached in 0.6 normal HCl for 30 minutes at 80° C. Leach slurries were varied from 20–33 percent solids. The slurries were filtered, washed with hot water and the products analyzed to provide the results shown. The results of the tests show operative temperature ranges between about 200°–400° C, operative heating times from 0.5–2.5 hours, and operative amounts of NH₄Cl from about 2.5 to 25 weight percent based on the concentrate. The results confirm those of Example 1, that is, the presence of ammonium chloride with the molybdenite concentrate during heat treatment significantly improves lead removal during the subsequent leach. The results further show that the heat treatment with ammonium chloride is equally effective when there are varying amounts of lead in the concentrate. Tests Nos. 1 and 6 are blanks in which the concentrate was heated without addition of ammonium NH₄Cl. It is seen that the amounts of lead remaining in the concentrate in these tests is far above the allowable maximum of about .07 percent lead, while in all the remaining tests in which the heating step was performed in the presence of ammonium chloride, the amount of lead remaining in the concentrate is well below the permissible maximum.

0.306 percent lead was mixed with 10% $NH_4Cl$ and heated for 1 hour at 300° C. Another molybdenite concentrate containing 0.70 percent lead was mixed with 2.5% $NH_4Cl$ and similarly heat treated. Portions of these materials were leached under various conditions for 30 minutes with the results shown in the table below.

| TEST No. | HEAT TREATMENT CONDITIONS | | | RESULTS | | |
|---|---|---|---|---|---|---|
| | Temperature °C | % $NH_4Cl$ | Time Hour | Initial Concentrate %Pb | Leached Residue %Pb | Mo Soluble % |
| 1 | 300 | 0 | 1.0 | 0.377 | 0.091 | 0.54 |
| 2 | 300 | 25 | 1.0 | 0.377 | 0.048 | 0.17 |
| 3 | 200 | 25 | 1.0 | 0.377 | 0.051 | 0.17 |
| 4 | 300 | 25 | 0.5 | 0.377 | 0.050 | 0.17 |
| 5 | 200 | 12.5 | 1.0 | 0.377 | 0.041 | 0.19 |
| 6 | 400 | 0 | 1.0 | 0.567 | 0.180 | 0.26 |
| 7 | 400 | 5 | 0.5 | 0.567 | 0.067 | 0.08 |
| 8 | 400 | 5 | 1.0 | 0.567 | 0.057 | 0.28 |
| 9 | 200 | 10 | 1.0 | 0.567 | 0.063 | 0.19 |
| 10 | 325 | 2.5 | 2.5 | 0.700 | 0.055 | 0.24 |

EXAMPLE 3

The following example illustrates the minimum amount of ammonium chloride which is effective when heated with molybdenite concentrate to result in removal of the required amount of lead by the subsequent HCl leach step.

For the example, several 100-gram portions of a molybdenite concentrate containing 52.0 percent molybdenum and 0.70 percent lead were mixed with varying amounts of ammonium chloride as shown in the table. All the mixtures were than heat treated for 1 hour at 300° C and leached in 400 ml. of 0.6–0.8 normal HCl for 30 minutes at 80° C. The slurries were filtered, washed with hot water and the products analyzed to give the results shown.

| Test No. | $NH_4Cl$ Added % | Leached Residue %Pb | Mo Soluble % |
|---|---|---|---|
| 1 | 1.0 | 0.062 | 0.25 |
| 2 | 1.5 | 0.060 | 0.24 |
| 3 | 2.0 | 0.046 | 0.65 |
| 4 | 2.5 | 0.067 | 0.17 |

The results of the tests shown that the amount of lead is reduced to well below the allowable maximum in the leach step when concentrate is leached after being heated with amounts of ammonium chloride down to 1 percent.

EXAMPLE 4

The following example illustrates how the acid strength, leach temperature, leach time and percent solids are optimized to obtain the best results with a given molybdenite concentrate.

A quantity of a molybdenite concentrate containing

| Test No. | Temperature °C | HCl N | Solids % | Leached Residue % Pb |
|---|---|---|---|---|
| (Initial Concentrate 0.306% Pb) | | | | |
| 1 | 80 | 0.30 | 28 | 0.046 |
| 2 | 80 | 0.90 | 28 | 0.042 |
| 3 | 80 | 1.20 | 28 | 0.040 |
| 4 | 80 | 0.30 | 40 | 0.049 |
| 5 | 80 | 0.30 | 50 | 0.052 |
| 6 | 80 | 0.30 | 60 | 0.050 |
| 7 | 23 | 0.30 | 40 | 0.078 |
| 8 | 45 | 0.30 | 40 | 0.058 |
| 9 | 65 | 0.30 | 40 | 0.049 |
| (Initial Concentrate 0.70% Pb) | | | | |
| 10 | 80 | 0.07 | 20 | 0.65 |
| 11 | 80 | 0.40 | 20 | 0.106 |
| 12 | 80 | 0.80 | 20 | 0.055 |
| 13 | 80 | 1.50 | 20 | 0.054 |

(All tests at 30 minutes)

The results of the tests show that for the lower lead-bearing concentrate, relatively mild acid strengths, low temperatures and high solids content in the leach slurry yield uniformly good results. In contrast, the higher lead-bearing concentrate required more rigorous leach conditions, but a suitably low lead product was easily obtained.

EXAMPLE 5

The following example presents comparative results obtained for the application of the present process and the ferric chloride leach process to molybdenite concentrate for reducing the lead content thereof.

A 100-gram portion of a molybdenite concentrate containing 52.0 percent molybdenum and 0.70 percent lead was mixed with 2.0 grams of $NH_4Cl$, heated for 1 hour at 300° C and then leached in 400 ml. of 0.8 N HCl for 30 minutes at 80° C. After filtering, the residue was analyzed and found to contain 0.046 percent lead.

A second 100-gram portion of the same concentrate was leached directly without heating with ammonium chloride in 200 ml. of a solution of 2.6 N HCl containing 150 grams per liter of FeCl$_3$. The leach was held at 80° C for 4 hours. After filtration, the leached residue was found to contain .096 percent lead.

This example demonstrates that the present process yields a superior removal of lead with a greater economy of reagents than the well known ferric chloride leach process.

EXAMPLE 6

The following example illustrates the effectiveness of the process for the removal from molybdenite concentrate of other metal impurities than lead.

For the tests the concentrates were heated at 300° C for 1 hour in the presence of NH$_4$Cl. The treated product was leached as in the other examples, the residue filtered, dried and analyzed with the following results.

|  | No. 1 | | No. 2 | |
| --- | --- | --- | --- | --- |
|  | Initial Concentrate | Leached Concentrate | Initial Concentrate | Leached Concentrate |
| % Mo | 52.88 | 56.6 | 40.25 | 45.3 |
| % Pb | 0.306 | 0.044 | 0.056 | 0.01 |
| % Cu | 0.037 | 0.012 | 0.74 | 0.16 |
| % Fe | 0.83 | 0.61 | 1.65 | 0.67 |
| % Ca | 0.028 | 0.003 | 0.16 | <0.01 |
| % Mg | 0.058 | 0.017 | 2.68 | 2.93 |
| % Na | 0.007 | 0.005 | 0.037 | 0.01 |
| % K | 0.055 | 0.055 | — | — |

The above results shown that the process is effective for removing metal impurities other than lead from molybdenite concentrate.

The operable percentage parameter ranges for the process are about .5–25% NH$_4$Cl, a temperature range from about 150–450° C, and a heating time from about .5 to 3 hours. Within these range limitations, a concentrate is produced in which the lead content can be reduced to below .07 percent by leaching with HCl.

The preferred amount of NH$_4$Cl is about 1–5 percent, the preferred temperature range is about 250° – 300° C and the preferred time is about 1–2 hours.

Of the other mineral acids tested for leaching the treated concentrate, nitric acid, although not as effective as hydrochloric acid, was the most effective.

From the above description of the operation of the invention and results obtained therefrom, it is apparent that a process is provided through which the lead content of molybdenite can be reduced below about .07 percent, thus making the concentrate commercial grade.

I claim:

1. The process for reducing the lead content of molybdenite concentrate which comprises heating the concentrate at a temperature between about 150°–450° C for a period of about ½ to 3 hours with from about .5–30 percent by weight of ammonium chloride, and leaching the treated concentrate with hydrochloric or nitric acid to convert lead in the concentrate to a soluble lead compound.

2. The process of claim 1 in which the temperature varies from about 250° – 350° C, the amount of NH$_4$Cl varies from about 1–5 percent, and the time varies from about 1–2 hours.

3. The process of claim 1 in which the temperature is 300° C and time is 1 hour.

4. The process of claim 1 in which the time is from about 1–2 hours, the temperature is from about 200°–400° C and the amount of ammonium chloride varies from about 1 percent to 25 percent based on the weight of the molybdenite concentrate.

5. The process of claim 1 in which free access of air to the heating step is prevented in order to preclude oxidation of molybdenum.

* * * * *